United States Patent
Gerbier et al.

(10) Patent No.: US 7,628,087 B2
(45) Date of Patent: Dec. 8, 2009

(54) LINEAR ACTUATOR

(75) Inventors: Dominique Gerbier, La Ville du Bois (FR); Jean-Michel Perrochat, Chaville (FR); Franck Bonny, Bagneux (FR)

(73) Assignee: Goodrich Actuation Systems SAS (FR)

( * ) Notice: Subject to any disclaimer, the term of this patent is extended or adjusted under 35 U.S.C. 154(b) by 687 days.

(21) Appl. No.: 10/995,939

(22) Filed: Nov. 23, 2004

(65) Prior Publication Data

US 2005/0132830 A1 Jun. 23, 2005

(30) Foreign Application Priority Data

Nov. 26, 2003 (GB) ................... 0327457.8

(51) Int. Cl.
*F16H 29/20* (2006.01)
(52) U.S. Cl. ..................... 74/89.23; 464/167
(58) Field of Classification Search ............... 74/89.34, 74/89.35, 89.23, 424.7, 424.85, 492, 493; 310/80; 324/207.18, 207.2, 207.24, 207.25, 324/220; 384/50, 55, 56, 13–15; 464/167
See application file for complete search history.

(56) References Cited

U.S. PATENT DOCUMENTS

| | | | | |
|---|---|---|---|---|
| 2,907,610 A | * | 10/1959 | Wise | 384/55 |
| 3,194,611 A | * | 7/1965 | Mahony | 384/24 |
| 3,365,914 A | * | 1/1968 | Asher | 464/167 |
| 3,622,211 A | * | 11/1971 | Mitton | 384/56 |
| 4,278,304 A | * | 7/1981 | Traut | 384/51 |
| 4,280,341 A | * | 7/1981 | Krude | 464/167 |
| 4,346,945 A | * | 8/1982 | Tsuboi | 384/55 |
| 4,385,297 A | * | 5/1983 | Schmitt et al. | 340/870.31 |
| 4,521,707 A | * | 6/1985 | Baker | 310/80 |
| 4,855,675 A | * | 8/1989 | Russell et al. | 324/207.19 |
| 5,028,148 A | * | 7/1991 | Kanamaru et al. | 384/12 |
| 5,144,851 A | * | 9/1992 | Grimm et al. | 74/89.26 |
| 5,391,953 A | * | 2/1995 | van de Veen | 310/80 |
| 5,620,259 A | * | 4/1997 | Mainardi | 384/58 |
| 6,067,868 A | * | 5/2000 | Nakamura et al. | 74/89.35 |
| 6,145,395 A | * | 11/2000 | Swanson et al. | 74/89.33 |
| 6,201,388 B1 | * | 3/2001 | Pecheny et al. | 324/207.2 |
| 6,253,632 B1 | | 7/2001 | Poulek | |
| 2003/0121714 A1 | | 7/2003 | Okada | |

* cited by examiner

*Primary Examiner*—Richard W L Ridley
*Assistant Examiner*—Phillip Johnson
(74) *Attorney, Agent, or Firm*—Andrus, Sceales, Starke & Sawall, LLP

(57) ABSTRACT

A linear screw actuator including, an outer housing which is fixed in use, an electric motor within the housing, the motor including a hollow rotatable output shaft, a rotatable but axially fixed nut driven by said output shaft, an elongate hollow axially translatable output member, said output member extending within said output shaft of said motor and cooperating with said rotatable nut, and, an elongate anchor member secured against rotation relative to said housing and extending within said output member, said anchor member cooperating with said output member to hold said output member against rotation whereby rotation of said nut relative to said output member causes axial translation of said non-rotatable output member relative to the housing.

7 Claims, 2 Drawing Sheets

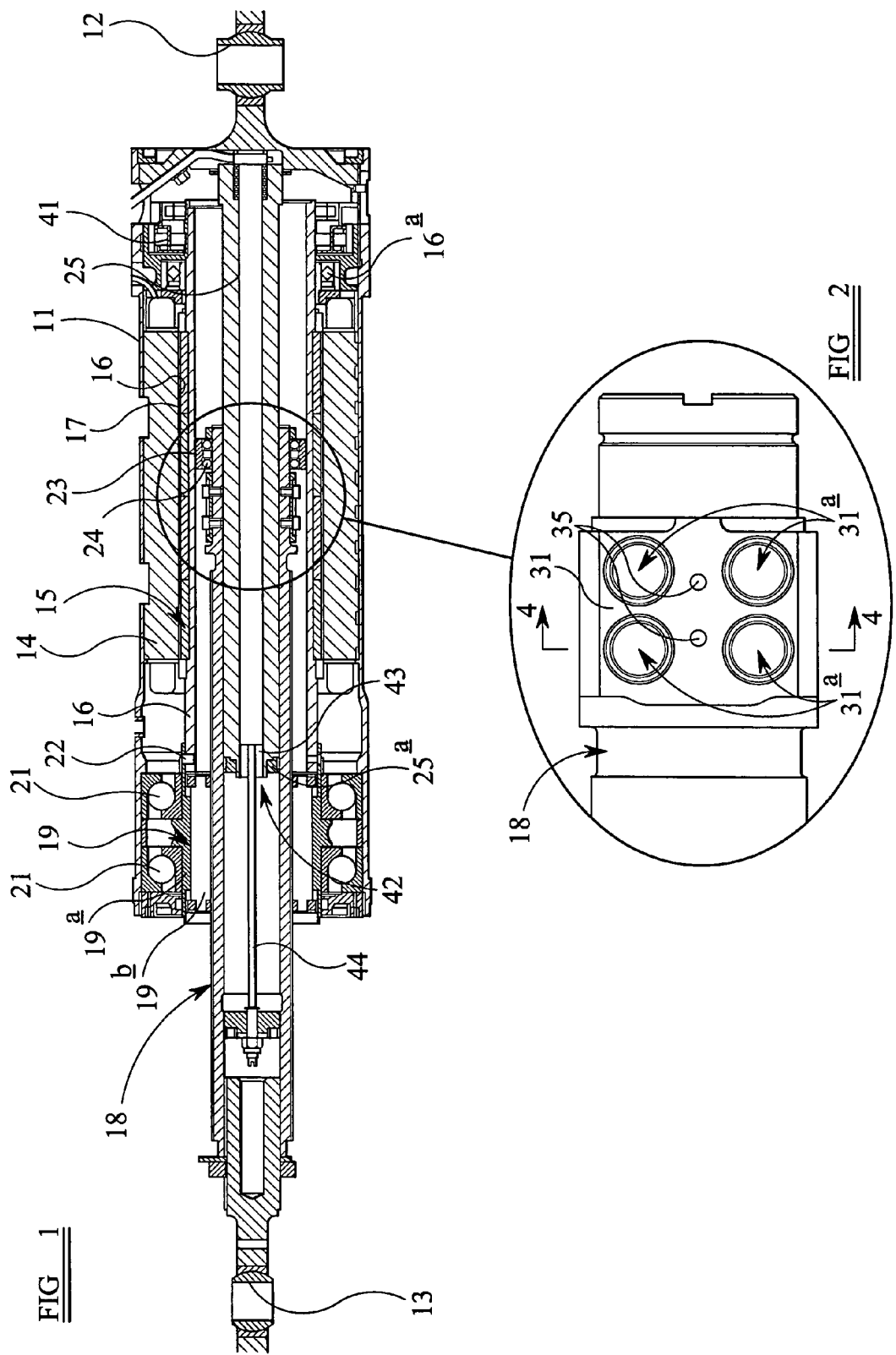

LINEAR ACTUATOR

TECHNICAL FIELD

The present invention relates to a screw operated linear actuator, particularly an electrically driven linear screw actuator.

BACKGROUND ART

U.S. Pat. Nos. 5,041,748, 2,918,827, and 2,446,393 show linear screw actuators where a rotatable input member is driven by an electric motor, and the output member is held against rotation relative to the input member so that a screw thread connection between the input and output members causes the output member to translate axially as the axially fixed input member is rotated by the electric motor. In each of the actuators the axially translatable output member is held against rotation by its connection to the device which is actuated by the actuator. Such an arrangement does not lend itself to a high speed/high load actuator and it is an object of the present invention to provide an actuator which is robust, and capable of rapid actuation in a high load environment.

DISCLOSURE OF THE INVENTION

In accordance with the present invention there is provided a linear screw actuator including an outer housing which is fixed in use, an electric motor within the housing and having a hollow rotatable output shaft driving a rotatable, but axially fixed nut of a screw actuator mechanism, an elongate hollow axially translatable output member of said screw actuator mechanism, said output member extending within said output shaft of said motor and cooperating with said rotatable nut, and, an elongate anchor member secured against rotation relative to said housing, and extending within said output member, said anchor member cooperating with said output member to hold said output member against rotation whereby rotation of said nut relative to said output member causes axial translation of said non-rotatable output member relative to the housing.

Conveniently said motor output shaft, said axially translatable output member and said anchor member are coaxial. A coaxial arrangement of actuator components as mentioned above facilitates the provision of a robust but compact actuator of relatively low weight and operable at relatively high power.

Preferably said elongate anchor member includes an axially extending region of non-circular cross-section with which said output member cooperates throughout its range of axial movement to resist rotation of the output member.

Preferably said non-circular region of said anchor member includes first and second axially extending flats with which said output member cooperates.

Desirably said first and second flats are spaced apart and coplanar.

Alternatively said first and second flats are positioned with their planes parallel and spaced.

Preferably said axially translatable output member cooperates with said flats through the intermediary of respective rollers rotatably mounted on the output member for rotation about axes transverse to the length of movement of the output member, said rollers engaging said flats respectively.

Preferably said anchor member has four axially extending flats each engaged by a respective roller of the axially translatable output member.

Preferably said four flats are arranged in two spaced pairs, the two pairs being spaced on opposite sides of the axis of the elongate output member, and the flats of each pair being arranged with their planes parallel and spaced apart.

Preferably said anchor member is in the form of an elongate hollow sleeve, and a position transducer or the like is received, in part, within said sleeve.

BRIEF DESCRIPTION OF THE DRAWINGS

One example of the invention is illustrated in the accompanying drawings wherein:—

FIG. 1 is a longitudinal cross-sectional view of a linear screw actuator;

FIG. 2 is a side elevational view, enlarged, of a component of FIG. 1;

PREFERRED MODE FOR CARRYING OUT THE INVENTION

Figure 3:
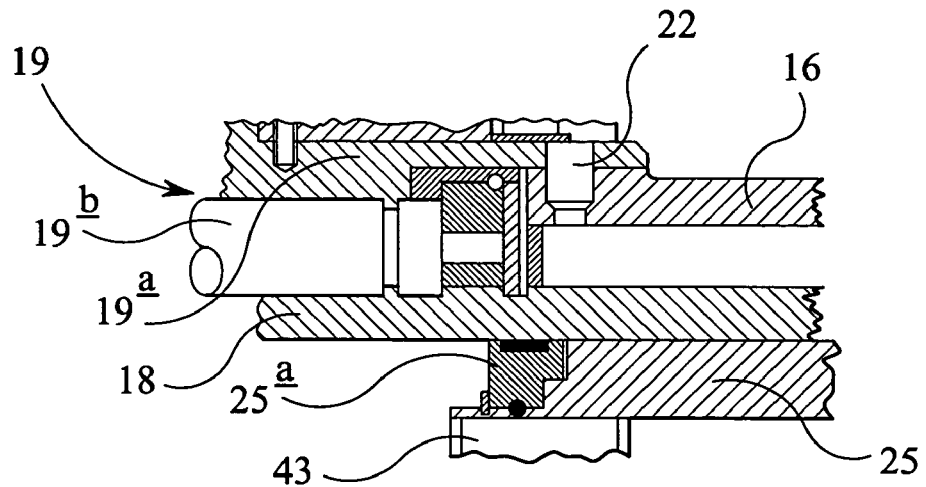
FIG. 3 is an enlargement of part of FIG. 1.

Referring to the drawings, the linear screw actuator comprises an outer housing 11 which is arranged to be fixed in use to an anchor structure through the intermediary of a conventional swiveling eye mount 12 rigidly secured to the housing 11. By way of example, if the actuator were used to control a thrust reverser for an aircraft jet engine then the mount 12 would be secured to a fixed component of the engine, and a similar swiveling eye mount 13 at the end of an output member of the actuator remote from the mount 12, would be secured to the movable thrust reverser cowl of the engine. It is to be understood however that the actuator is not specifically intended for use in an aircraft engine thrust reverser mechanism, and can find use in other applications where high speed operation of a component is required in a high load environment.

A wound stator 14 of a permanent magnet electric motor is received within the housing 11 and rotatable within the stator 14 is a permanent magnet rotor 15 of the electric motor. The rotor 15 comprises an elongate hollow shaft 16 supported at one end for rotation in bearings 16a within the housing 11 and carrying a plurality of samarium-cobalt permanent magnets 17. In conventional manner electrical energisation of the wound stator 14 causes rotation of the rotor 15 within the housing 11.

Slidably received within the hollow shaft 16, and coaxial therewith, is an axially moveable output member 18 of a roller screw mechanism.

The roller screw mechanism is of generally conventional form, including a roller nut 19 mounted for rotation in a bearing assembly 21 at the end of the housing 11 remote from the mount 12. The planetary rollers 19b of the roller nut 19 have circumferential ribs engaging the convolutions of a multi-start screw thread formed on the exterior of the output member 18. Rotation of the roller carrier 19a of the roller nut 19 causes the rollers 19b thereof to orbit around the elongate output member 18 and cooperation between the ribs of the rollers and the grooves of the multi-start thread on the exterior cylindrical surface of the output member 18 drives the output member 18 axially relative to the nut 19 and thus the housing 11 provided that the member 18 is held against rotation.

At its end remote from the mount 12 the hollow output shaft 16 of the electric motor is directly coupled by radially extending pins 22 to a coaxial region of the roller carrier 19a of the nut 19. Thus the nut 19 is driven directly by the electric motor of the actuator, the roller carrier 19*a* of the nut 19 being directly linked to the output shaft 16 of the motor. Moreover the coupling of the shaft 16 to the carrier 19*a* allows the bearing assembly 21 of the carrier 19*a* to support the end of the shaft 16 remote from the bearings 16*a* for rotation in the housing 11.

The hollow, cylindrical, output member 18 of the actuator is threaded along the majority of its length, but at its outermost end, that is to say its end remote from the mount 12 of the housing 11, the output member 18 carries the swivelling eye mount 13 mentioned above. At its opposite end, within the motor output shaft 16, the output member 18 carries a collar 23 slidably engaging the inner surface of the shaft 16. The collar 23 is mounted on the inner end of the output member 18 through bearings 24 so that the collar 23 can rotate with the shaft 16, while being axially slidable relative thereto, and while the output member 18 is held against rotation. The collar 23 and bearings 24 provide support for the inner end of the output member 18 throughout its axial travel relative to the shaft 16, centering the hollow output member 18 within the hollow shaft 16.

Figure 4:
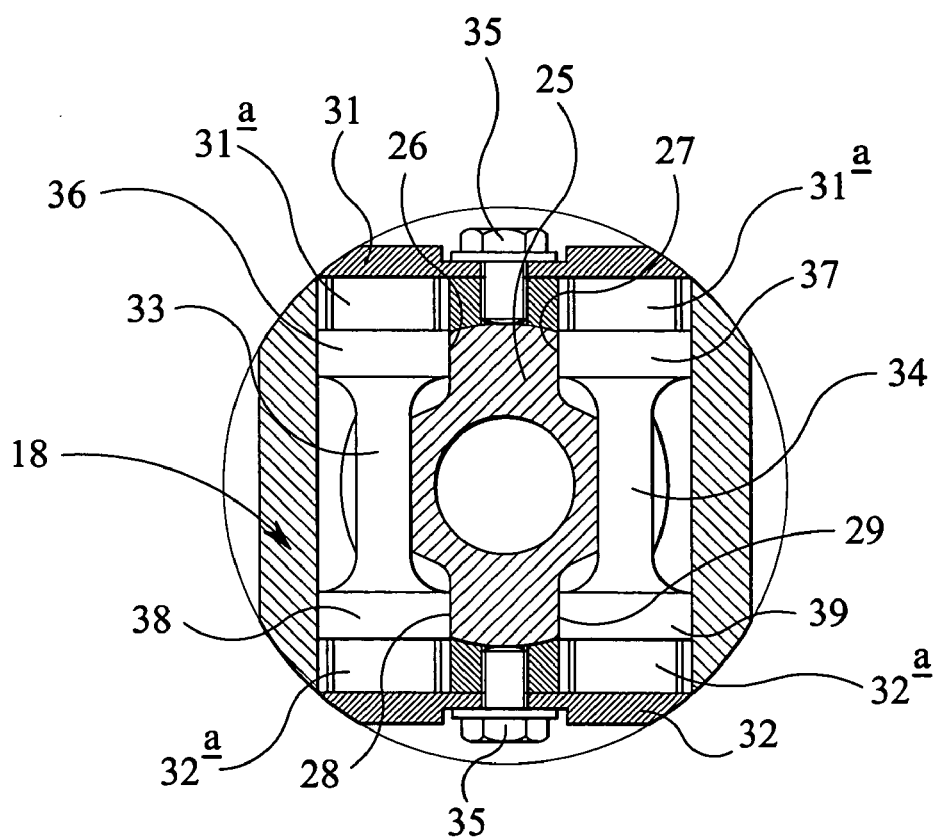
FIG. 4 is an enlarged cross-sectional view on the line four-four in FIG. 2.

A hollow elongate anchor member 25 extends coaxially within the housing 11 from the end thereof carrying the mount 12, and terminates within the housing 11 adjacent the inner end of the roller nut 19. The anchor member 25 is rigidly secured to the housing 11 adjacent the mount 12, the housing 11 being particularly robust in the region of the mount 12 and the anchor member 25. Throughout substantially the whole of the axial length of the anchor member 25 within the motor output shaft 16, the anchor member 25 is of a constant, non-circular cross-section. The cross-sectional shape of the anchor member 25 is best seen in FIG. 4, from which it can be noted that the otherwise circular-cylindrical anchor member is relieved on opposite sides of a diameter thereof to provide four axially extending flat surfaces 26, 27, 28, 29. The non-circular cross-section of the anchor member 25 is symmetrical, the surfaces 26 and 28 being coplanar, and the surfaces 27 and 29 being coplanar. The surfaces 26 and 28 and the surfaces 27 and 29 are equidistantly spaced on opposite sides of a diametric plane of the anchor member 25. Similarly, the surfaces 26 and 27 and the surfaces 28 and 29 are equidistantly spaced on opposite sides of a second diametric plane of the anchor member, said second diametric plane being at 90° to the first mentioned diametric plane.

The inner end region of the axially movable output member 18, adjacent to the collar 23 and bearing assembly 24, is internally relieved to define a roller housing closed by upper and lower closure plates 31, 32, and receiving therein first and second roller shafts 33, 34 extending parallel to one another on opposite sides of the anchor member 25. The roller shafts 33, 34 extend parallel to the planes of the surfaces 26, 27, 28, 29 and are mounted for rotation in bearings 31*a*, 32*a* in the closure plates 31, 32 respectively. The closures plates 31, 32 are secured to the output member 18 by respective bolts 35, and adjacent its ends each of the shafts 33, 34 is shaped to define an integral roller 36, 37, 38, 39, the rollers 36, 38 of the shaft 33 engaging the flats 26, 28 of the anchor member 25 respectively while the rollers 37, 39 of the shaft 34 simultaneously engage the flats 27, 29 on the opposite side of the anchor member 25.

It will be recognised that the rollers 36-39 do not impede axial movement of the output member 18 along the length of the anchor member 25, but do prevent rotation of the member 18 in either direction relative to the anchor member 25, and thus relative to the housing 11 and the nut 19. The member 18 is slidably supported on the member 25 for axial movement, a p.t.f.e guide collar 25*a* being carried at the end of the member 25 within the member 18.

It will be recognised that the coaction of the rollers and flats provides an extremely robust but relatively friction free, means of holding the output member 18 against rotation relative to the anchor member 25 and the housing 11, and can thus accommodate substantial torque when the motor, which may be operated at high power, is energised.

In order that an operating system can recognise the rotational position of the output shaft 16 at any given point in the operation of the actuator, there is provided a resolver 41 within the housing 11 and driven directly by the shaft 16, the resolver providing output signals representative of the rotated position of the shaft 16. The resolver may be in the form of a Hall-Effect transducer although other alternative forms of rotational position encoder may be provided if desired.

The axial position of the output member 18 relative to the housing 11 is conveniently monitored by a Linear Variable Differential Transformer (LVDT) 42 comprising a body 43 secured within the hollow anchor member 25, adjacent its free end, and a movable rod 44 extending coaxially within the member 18 and secured thereto, the rod 44 cooperating with the body 43 to provide output signals, in known manner, representative of the axial position of the member 18 relative to the member 25 and thus relative to the housing 11. Although it is preferred to use a roller screw mechanism 18, 19 to convert rotational movement of the output shaft 16 of the motor into axial movement of the output member 18, since roller screw mechanisms are known to be able to carry substantial load with relatively low friction, it is to be understood that in some applications it may be desired to replace the roller screw mechanism with a ball-screw mechanism, or even a plain screw arrangement.

Energisation of the motor at high power causes rapid rotation of the nut 19 and rapid axial movement of the member 18, the speed of which is a function of the motor speed and the pitch of roller screw mechanism. The direction of operation of the motor and thus of rotation of the output shaft 16 determines whether the member 18 is extended or retracted relative to the housing 11. Overtravel stops (not shown) will limit the throw of the member 18 but lesser limits will usually be provided by control over energisation of the motor in relation to the positional signals fed back from the resolver and the LVDT.

The coaxial arrangement of the actuator components including the arrangement of the anchor member 25 within the output member 18 and the output member 18 within the motor output shaft 16, provides for a high power actuator arrangement which is both compact and relatively light weight.

The invention claimed is:

1. A high speed, high load, aerospace linear screw actuator including, an outer housing which is fixed in use, an electric motor within the housing, the motor including a hollow rotatable output shaft, a rotatable but axially fixed nut driven by said output shaft, an elongated hollow axially translatable output member, said output member extending within said output shaft of said motor and cooperating with said rotatable nut, and, an elongate anchor member secured against rotation relative to said housing and extending within said output member, said anchor member cooperating with said output member to hold said output member against rotation whereby rotation of said nut relative to said output member causes axial translation of said output member relative to the housing,
wherein said elongate anchor member includes an axially extending region of non-circular cross-section having first and second pairs of axially extending flat surfaces with which said output member cooperates throughout its range of axial movement to resist rotation of the output member, the output member cooperating with the flat surfaces through an intermediary of respective pairs of cylindrical rollers rotatably mounted on the output member for rotation about axes transverse to the length of movement of the output member, each pair of cylindrical rollers formed integrally with and carried on a common roller shaft, the shafts defining the axes of rotation of the respective pairs of cylindrical rollers, said rollers engaging said flat surfaces with full, straight line contact, respectively, and being mounted for rotation by bearings, the first and second pairs of flat surfaces being spaced on opposite sides of the axis of the output member, the flat surfaces of each pair being arranged with their planes parallel and spaced apart on opposite sides of the said axis.

2. A linear screw actuator as claimed in claim 1 wherein said motor output shaft, said output member and said anchor member are coaxial.

3. A linear screw actuator as claimed in claim 1 wherein said anchor member has four axially extending flat surfaces each engaged by a respective roller of the output member.

4. A linear screw actuator as claimed in claim 1 wherein said anchor member is in the form of an elongate hollow sleeve, and a position transducer is received, in part, within said sleeve.

5. A linear screw actuator as claimed in claim 1 wherein the output member carries a collar slidably engaging an inner surface of the output shaft.

6. A linear screw actuator as claimed in claim 1 comprising a pair of roller shafts on each side of the axis of the anchor member.

7. A linear screw actuator as claimed in claim 6 wherein each roller shaft is supported for rotation by a pair of said bearings.

\* \* \* \* \*

UNITED STATES PATENT AND TRADEMARK OFFICE
CERTIFICATE OF CORRECTION

PATENT NO. : 7,628,087 B2
APPLICATION NO. : 10/995939
DATED : December 8, 2009
INVENTOR(S) : Gerbier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Second Day of November, 2010

David J. Kappos
*Director of the United States Patent and Trademark Office*